United States Patent
Guthrie et al.

(10) Patent No.: US 6,691,220 B1
(45) Date of Patent: Feb. 10, 2004

(54) MULTIPROCESSOR SPECULATION MECHANISM VIA A BARRIER SPECULATION FLAG

(75) Inventors: Guy Lynn Guthrie, Austin, TX (US); Ravi Kumar Arimilli, Austin, TX (US); John Steven Dodson, Pflugerville, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 09/588,608

(22) Filed: Jun. 6, 2000

(51) Int. Cl.[7] .............................. G06F 9/00; G06F 13/00
(52) U.S. Cl. ........................ 712/30; 712/219; 712/235
(58) Field of Search .............................. 712/30, 23, 28, 712/205, 218, 226, 231, 233, 234, 235, 237, 245, 246, 40, 216, 225, 228, 219

(56) References Cited

U.S. PATENT DOCUMENTS

| 5,615,350 | A | * | 3/1997 | Hesson et al. | 712/218 |
|---|---|---|---|---|---|
| 5,737,636 | A | * | 4/1998 | Caffo et al. | 710/54 |
| 5,740,419 | A | * | 4/1998 | Potter | 712/241 |
| 5,805,470 | A | * | 9/1998 | Averill | 703/27 |
| 5,872,948 | A | * | 2/1999 | Mallick et al. | 712/214 |
| 5,987,595 | A | * | 11/1999 | Yoaz et al. | 712/216 |
| 6,189,088 | B1 | * | 2/2001 | Gschwind | 712/216 |
| 6,209,073 | B1 | * | 3/2001 | Okpisz et al. | 711/169 |
| 6,285,974 | B1 | * | 9/2001 | Mandyam et al. | 703/13 |
| 6,286,095 | B1 | * | 9/2001 | Morris et al. | 712/216 |
| 6,415,380 | B1 | * | 7/2002 | Sato | 712/217 |

* cited by examiner

Primary Examiner—Henry W. H. Tsai
(74) Attorney, Agent, or Firm—Casimer K. Salys; Bracewell & Patterson, L.L.P.

(57) ABSTRACT

A method of operation within a processor that permits load instructions following barrier instructions in an instruction sequence to be issued speculatively. The barrier instruction is executed and while the barrier operation is pending, a load request associated with the load instruction is speculatively issued. A speculation flag is set to indicate the load instruction was speculatively issued. The flag is reset when an acknowledgment of the barrier operation is received. Data that is returned before the acknowledgment is received is temporarily held, and the data is forwarded to the register and/or execution unit of the processor only after the acknowledgment is received. If a snoop invalidate is detected for the speculatively issued load request before the barrier operation completes, the data is discarded and the load request is re-issued.

14 Claims, 10 Drawing Sheets

1) St-An     [GROUP A]
2) Ld-A0
3) Ld-An
4) Sync A
5) Ld-B0     [GROUP B]
6) Ld-Bn
7) St-Bn

*Fig. 6A*

1) Ld-A0
2) Ld-A1
3) St-An
4) Sync-A
5) Ld-B0
6) Ld-B1
7) St-Bn
8) Sync-B
9) Ld-C0
10) Ld-C1
11) St-Cn
12) Sync-C
13) Ld-D0
14) Ld-D1
15) St-Dn
16) Sync-D

*Fig. 6B*

Instruction Order | Memory Subsystem Execution Order
--- | ---
St-A0 | St-A0
St-A1 | St-A1
Sync-A | St-B0
St-B0 | St-B1
St-B1 | Sync A and B
Sync-B |

*Fig. 6D*

| Proc. Issue Order | LSU Order to Memory Subsystem | Memory Subsystem Execution Order | LSU Completion Order |
|---|---|---|---|
| 1) Ld-A0 | 1) Ld-A0<br>Sync-A | 1) Ld-B0 | 1) Ld-A0 |
| 2) Ld-B0 | 2) Ld-B0<br>Sync-B | 2) Ld-D0 | 2) Ld-B0 |
| 3) St-C0 | 3) St-C0<br>Sync-C | 3) Ld-A0 | 3) St-C0 |
| 4) Ld-D0 | 4) Ld-D0<br>Sync-D | 4) St-C0<br>5) Sync A, B, C, D | 4) Ld-D0 |

*Fig. 6C*

MULTIPROCESSOR SPECULATION MECHANISM VIA A BARRIER SPECULATION FLAG

RELATED APPLICATIONS

The present invention is related to the subject matter of the following commonly assigned, co-pending United States Patent Applications filed concurrent herewith:

Ser. No. 09/588,607 entitled "System and Method for Asynchronously Overlapping Storage Barrier Operations With Old and New Storage Operations";

Ser. No. 09/588,606 entitled "Multiprocessor Speculation Mechanism With Imprecise Recycling of Storage Operations";

Ser. No. 09/588,605 entitled "Multiprocessor Speculation Mechanism for efficiently Managing Multiple Barrier Operations";

Ser. No. 09/588,508 entitled "System and Method for Providing Weak Consistent Storage Advantage To a Firmly Consistent Storage Architecture";

Ser. No. 09/588,509 entitled "Mechanism for Folding Storage Barrier Operations in a Multiprocessor System";

Ser. No. 09/588,483 entitled "Multi-level Multiprocessor Speculation Mechanism"; and Ser. No. 09/588,507 entitled "System and Method for Providing Multiprocessor Speculation Within a Speculative Branch Path".

The content of the above-referenced applications is incorporated herein by reference.

BACKGROUND OF THE INVENTION

1. Technical Field

The present invention relates in general to data processing systems and in particular to processing of barrier operations in multiprocessor data processing systems. Still more particularly, the present invention relates to a method and processor architecture for improving processing of instruction sequences by speculatively executing load instructions before the completion of a prior synchronization (sync) operation.

2. Description of the Related Art

The need for faster and more efficient processing of computer instructions has typically been at the forefront of development in processors and data processing systems. Traditional processors execute instructions in a sequential order, i.e., subsequent instructions were executed only after the execution of the previous instruction was completed. These traditional processors are referred to as firmly consistent processors. In firmly consistent processors, there is an implied barrier after each instruction although there is no barrier operation included in the code sequence. Thus, these processors do not support speculative, out-of-order execution of instructions.

Development of faster processors necessitated the creation of weakly consistent processor architectures, which permit some amounts of speculation (such as branch speculation) and out-of-order execution of instructions. To enable these types of execution, a processor assigns a series of instructions to a group when no dependencies exist between instructions within that group. Instructions within a group can be executed in parallel or out-of-order (i.e., later instructions executed before earlier instructions). However, due to data dependencies, particularly with load and store instructions, within instructions sequences, instructions in different groups must be executed in program order to obtain correct processing results.

In multiprocessor systems, the completion of operations within code sequences executing on a first processor may be dependent on operations on a second processor. To observe such dependencies and maintain proper instruction execution order, it is necessary to place barrier instructions within the instruction sequence, which ensure that all instructions within a first code segment are fully executed (i.e., visible to all other processors) before any instruction within a subsequent code segment is executed. Barrier instructions are particularly necessary when the multiprocessor system includes superscalar processors supporting out-of-order instruction execution and weak memory consistency. For example, with load and store instructions executed by the load/store unit (LSU), a previous instruction that stores a value to a particular location must be executed before a later instruction that loads the value of that location. The instructions set architecture (ISA) supported by most popular commercial processors includes an instruction for setting such a processing boundary (i.e., a barrier instruction), which initiates a barrier operation on the system. In the PowerPC™ family of processors, for example, the barrier instruction, which is employed by a programmer to establish a processing boundary, is called a "sync" instruction, and the corresponding transaction on the system bus is called a synchronization operation (sync op). The sync instruction orders instruction execution. All instructions initiated prior to the sync instruction must be completed before the sync operation yields a sync acknowledgment (ack), which is returned to the LSU. In addition, no subsequent instructions are issued until the sync ack is received by the LSU. Thus, the sync instruction creates a boundary having two significant effects: (1) instructions which follow the sync instruction within the instruction stream will not be executed until all instructions which precede the sync instruction in the instruction stream have completed; and (2) instructions following a sync instruction within the instruction stream will not be reordered for out-of-order execution with instructions preceding the sync instruction.

An example instruction sequence with a sync op is illustrated in FIG. 6A. The first three load or store (Ld/St) instructions before the sync instruction comprise group A, and the instructions following the sync instruction comprise group B. During normal operation, the above instruction sequence is executed serially, i.e., group A instructions are issued, followed by the sync. Upon detection of the sync, a sync operation is initiated on the system bus. The sync op prevents instructions in all of the processors to be held up (i.e., not issued) until the sync op is completed. The LSU then waits for the receipt of a sync ack from the indicating completion of all group A operations, before allowing any of the Group B instructions to be issued. Once the sync ack is received, the instructions from Group B are issued.

Because the operation of one processor in a multiprocessor system may affect another processor cache (i.e., data being loaded by one processor may have been invalidated by a store operation from another processor), sync operations, by ensuring that all previous store operations are completed, guarantee the processor will load valid data. The sync operation creates a boundary to further load and store operations by the issuing processor until all previous operations are completed. In doing so, the sync clears all processor pipelines of instructions.

In slower processors, which operate at, for example, 100 MHz, each barrier instruction, such as a sync, requires approximately 10 processor cycles to complete. With faster processors, however, such as those operating in the Ghz range, a sync completes in approximately 100 processor cycles. Thus, syncs place a significant burden on processor efficiency, particularly because, in typical software, syncs occur every 500–1000 instructions. Each occurrence of a sync causes processors in a data processing system to stall for 100 cycles while the issuing processor waits on the sync operation to complete. Another factor influencing sync performance in current architectures is the fact that the processor pipeline may include as many as 20–50 pipeline stages that require as many as 40–50 cycles to process an instruction. Thus, waiting until the entire pipeline drains (i.e., all previous instructions are completed) when a sync is encountered significantly compromises processor speed and efficiency.

The penalty associated with each sync operation worsens as technology progresses because of the rigid functional placement of sync operations. Other technological advances, such as, for example, increasing the number of execution units within a processor to allow more instructions to be executed in parallel or implementation of larger caches, resulting in more cache hits, positively affect processor efficiency. However, even if sync instructions remain a fixed percentage of all runtime instructions, because more instructions are being executed in parallel, the sync instructions consume a larger portion of available processor cycles and bandwidth. Furthermore, as memory hierarchies—all levels of which are affected by a sync instruction—become deeper, the performance penalty associated with a single sync instruction also increases.

The present invention recognizes that it would therefore be desirable to provide a method and processor architecture for enabling speculative execution of load instructions beyond a sync to reduce processor stalls while awaiting a sync ack and thereby increase processor speed and efficiency.

SUMMARY OF THE INVENTION

A processor architecture is described, which comprises a load store unit (LSU) coupled to an upper and a lower level cache and to processor registers. The processor architecture enables the processor to efficiently process load/store instruction sequences without losing processor cycles while waiting on the completion of a barrier operation (sync op). The LSU contains a barrier operation controller, which is coupled to and interacts with the LSU's load request queue (LRQ) and store/barrier queue. The barrier operation controller permits load instructions subsequent to a sync in an instruction sequence to be speculatively issued by the LRQ prior to the return of the sync acknowledgment. To speculatively issue load requests, the barrier operation controller maintains a multiprocessor speculation (MS) flag in each entry of the LRQ. Each MS flag tracks if and when data returned from a speculatively issued load request can be forwarded to the processor's execution units, registers or L1 cache. A MS flag is set by the barrier operation controller when the associated load request is issued speculatively (i.e., load request that misses the L1 cache and is issued before receipt of a sync ack) and reset when the sync ack has been received. Also, the barrier operation controller permits the data returned from the L1 cache, L2 cache or memory to be held temporarily until a sync ack is seen.

In one embodiment, if at any time while the MS flag is set an invalidate is received corresponding to the cache line being speculatively loaded, the load request is re-issued. If the load request is re-issued after the sync ack, it is treated as non-speculative.

When the processor architecture of the present invention is applied to a multiprocessor architecture, a sync ack returns only when all the previously issued instructions have completed their operations, including operations that occur on other processors. Once the sync ack returns, then the temporarily held data can be forwarded from the LRQ to the L1 cache, processor registers, and/or execution units if an invalidate has not been received.

In another embodiment, speculative execution is allowed beyond multiple barrier operations. Thus, each group of instructions occurring after a barrier instruction in the sequence is assigned a unique MS flag. Thus, when a sync acknowledgment is received, only the returned data for the group corresponding to the particular barrier operation is forwarded to the processor registers or execution units.

The invention may be utilized to provide more efficient processing by a firmly consistent processor by coupling it to a weakly consistent storage subsystem. In this embodiment, an ordered instruction sequence from the firmly consistent processor is provided to a weakly consistent storage subsystem via a modified load store unit (LSU). After issuing each instruction, the LSU issues a barrier instruction to complete a barrier operation on the system bus. The barrier operations are completed sequentially. The load and store operations, however, are completed out-of-order within the memory subsystem. When data are returned corresponding to a load request issued prior to a return of a sync ack for a prior sync, the LSU waits on the return of the sync ack before forwarding the data to the registers and execution units of the processor. Because the barrier operations complete in a sequential manner, the original order is maintained in forwarding the data.

In another embodiment, the invention combines sync instructions and provides a single combined sync operation on the system bus. When two or more sync instructions are within the store/barrier queue and the store operations preceding the sync operations have been completed, the sync instructions are combined into a single sync instruction, which provides a single sync operation on the system bus.

Another embodiment of the present invention removes sync operations from an instruction sequence. In this embodiment, the L1 and L2 caches are monitored to determine if all the load/store operations prior to a sync operation hit in either cache. When all the load/store operations hit in the caches, the following sync operation is discarded, and the subsequent group of load/store operations are executed as if no preceding sync operation existed.

In yet another embodiment, the invention enhances a speculative branch mechanism. After a speculative branch path is taken, the invention permits branch processing to continue beyond the occurrence of the first and subsequent barrier instructions. When the branch is resolved as correctly predicted, significant time savings results because of the post barrier instruction processing. If the branch is resolved as incorrectly predicted, data and other process results of speculative execution are discarded.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 6A and 6B are two sample instruction sequences with sync operations utilized to illustrate the present invention;

FIG. 6C is a table illustrating the issuing of instructions from a firmly consistent processor to a weakly consistent memory subsystem in accordance with one embodiment of the present invention;

FIG. 6D is a sample instruction sequence illustrating the combination (or collapsing) of multiple syncs according to the present invention;

DETAILED DESCRIPTION OF AN ILLUSTRATIVE EMBODIMENT

Figure 1:
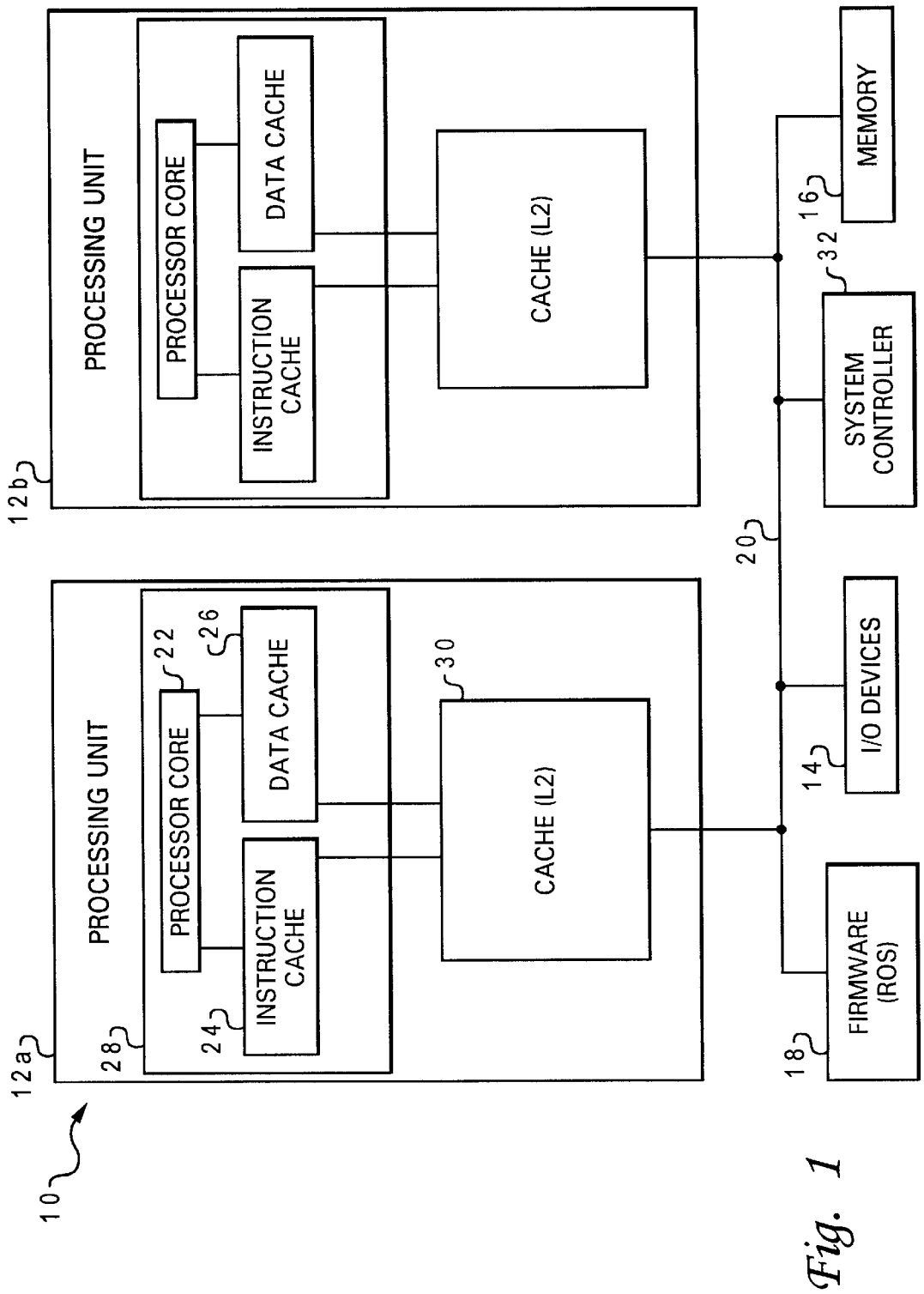
FIG. 1 depicts a high level block diagram of a multiprocessor data processing system which may be utilized to implement the present invention.

With reference now to the figures, and in particular with reference to FIG. 1, there is illustrated a high level block diagram of a multiprocessor computer system in which the present invention may be implemented. Computer system 10 has several processing units, two of which, 12a and 12b, are depicted. Processing units 12a and 12b are connected to various peripheral devices, including input/output (I/O) devices 14 (such as a display monitor, keyboard, graphical pointer (mouse), and a permanent storage device or hard disk), and system controller 32. Peripheral devices also include memory device 16 (such as random access memory or RAM), which is used by the processing units to carry out program instructions, and firmware 18, whose primary purpose is to seek out and load an operating system from one of the peripherals (usually the permanent memory device) whenever the computer is first turned on. Processing units 12a and 12b communicate with the peripheral devices by various means, including a generalized interconnect or system bus 20, or direct memory access channels (not shown). Computer system 10 may have many additional components which are not shown, such as serial, parallel, and universal serial bus (USB) ports for connection to, e.g., modems, printers or scanners, and a display adapter used to control a video display monitor, etc.

Each processing unit 12a, 12b has one or more caches, such as level 1 (L1) instruction cache 24 and data cache 26, and L2 cache 30, which are implemented using high speed memory devices. Caches are commonly used to temporarily store data that might be repeatedly accessed by a processor, in order to speed up processing by avoiding the additional latency of loading the values from memory 16. Caches are referred to as "on-board" caches (e.g., L1 caches) when they are integrally packaged with the processor core on a single integrated chip 28. Each cache is associated with a cache controller (not shown) that manages the transfer of data and instructions between the cache memory and the processor core or other levels in the memory hierarchy. L2 cache 30 is connected to system bus 20, and all information loaded from memory 16 into processor core 22 is routed through L2 cache 30 via system bus 20. Although FIG. 1 depicts only a two-level cache hierarchy, multi-level cache hierarchies can be provided where there are many levels (L3, L4, etc.) of serially connected or look-aside caches.

In a symmetric multiprocessor (SMP) computer, all of the processing units are generally identical, that is, they all use a common set or subset of instructions and protocols to operate, and generally have the same architecture. An exemplary processing unit includes one of the line of PowerPC™ processors marketed by International Business Machines Corp. As illustrated in FIG. 1, a processing unit includes a processor core 22 having a plurality of registers and execution units, which carry out program instructions in order to operate computer system 10. The execution circuitry of processors core 22 comprises multiple execution units, including, for example, two fixed-point units (FXUs), two load/store units (LSUs), and two floating-point units (FPUs). As is well-known to those skilled in the computer art, each of the execution units typically executes one or more instructions of a particular type of instructions during each processor cycle.

As its name implies, the LSU typically executes load instructions, which load data from L1 data cache 26, L2 cache 30, or memory 16 into selected general purpose registers (GPRs), GPR rename buffers, fixed purpose registers (FPRs) or FPR rename buffers in processor core 22. The LSU also executes store instructions, which store data from a selected one of GPRS, GPR rename buffers, FPRs, or FPR rename buffers to memory. The present invention extends the functionality of the LSU during loading of data to allow speculative loading beyond a sync in the instruction sequence.

The present invention will be described with reference to the above computer system 10 but may be implemented in many other types of computer system architecture. The reference herein to a particular system architecture is therefore not meant to be limiting on the invention.

The present invention provides a new processor architecture (and method), which allows an LSU to execute load instructions beyond a barrier operation (hereinafter referred to as a sync op or sync) in an instruction sequence. More specifically, the invention entails the inclusion of new hardware logic within the load queue of the LSU, which provides a functionality by which the previous "wait on sync ack" requirement before executing subsequent load instructions is removed and load operations subsequent to a sync are speculatively executed before the sync ack is received at the LSU. The invention permits speculative loads, as the data returned is speculative with respect to the pending completion of the sync operation. Thus, the hardware logic, which is referred to as a barrier operation controller, also provides a mechanism that tags loads subsequent to a sync and temporarily holds load data returned from a memory subsystem in a holding location. The barrier operation controller also causes the LSU to re-execute a load whenever particular types of invalidates are received before a sync ack, as will be described in detail below.

After a sync op commences on the system bus, a sync ack is returned when the preceding load/store operations have all been completed. In faster processors this process can require 100 or more processor cycles. Thus, if the subsequent (speculative) load is correct, i.e., data dependencies were observed, then a performance benefit results of 100 or more processor cycles for each sync op. When a data dependency is not observed, the load instruction has to be re-executed to fetch the correct data. Thus, at worst case, processor performance is unchanged.

Figure 2:
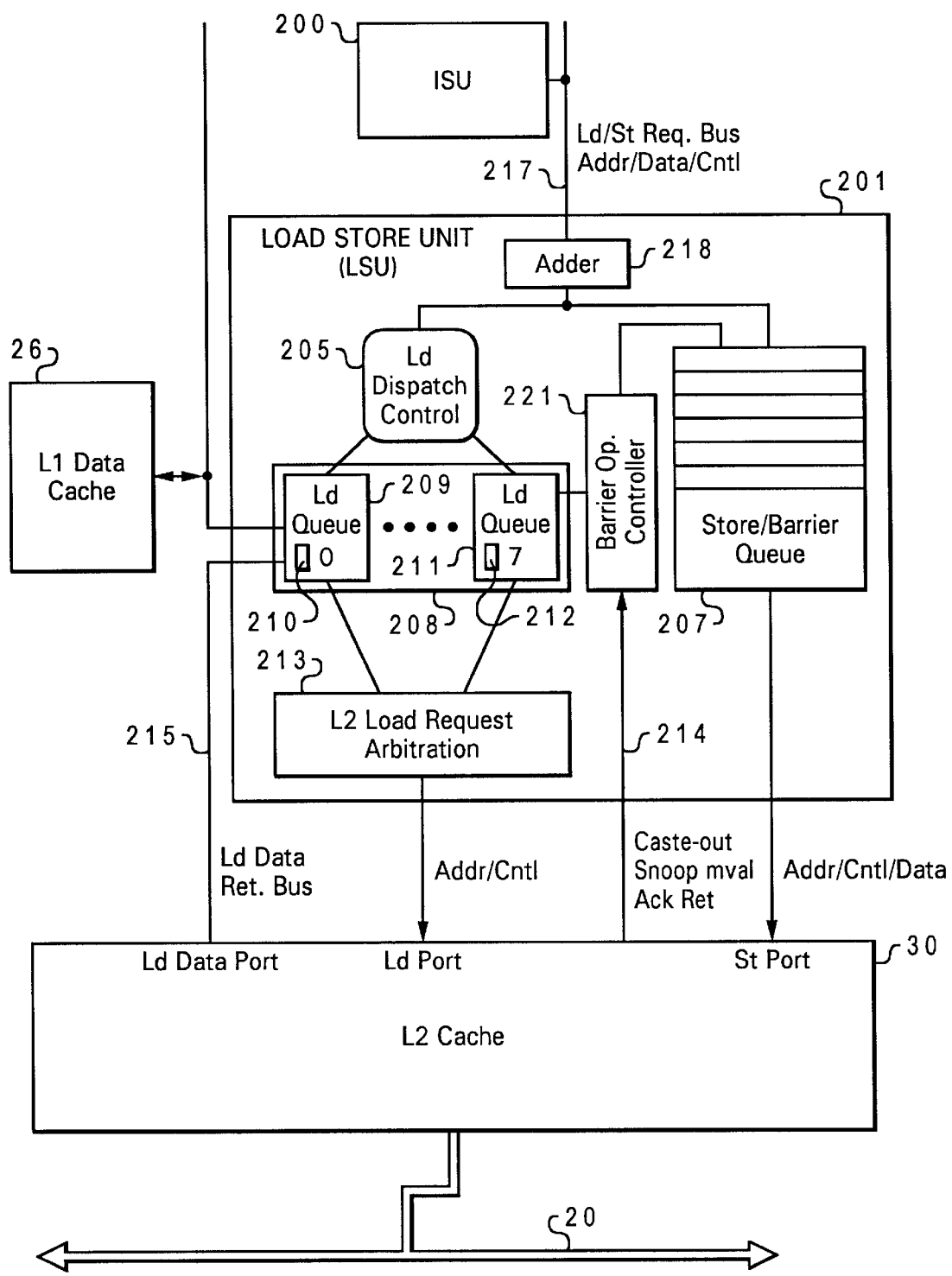
FIG. 2 is a block diagram of a preferred embodiment of a Load/Store Unit (LSU) utilized in accordance with the present invention.

FIG. 2 illustrates a preferred embodiment of an LSU in accordance with the present invention. LSU 201 is one of the execution units within the processor core 22 of computer system 10 illustrated in FIG. 1. LSU 201 includes an adder 218, which receives load/store instructions from instruction sequencing unit (ISU) 200 via load/store request bus 217. The load/store instructions are received in program order, i.e., in the sequence in which they were placed by the computer or programmer. Adder 218 calculates the target effective addresses of load and store instructions in the instruction stream. Adder 218 then forwards the target addresses for load instructions to load dispatch control unit 205 and forwards sync instructions and target addresses for store instructions to store/barrier queue 207.

Load dispatch control unit 205 places the load instructions into an 8 entry (0–7) Load Request Queue (LRQ) 208. Load register 0 209 through load register 7 211 hold the load instructions and are further coupled to L2 load request arbitration unit 213, which determines the order for issuing the load requests out to L1 data cache 26 or L2 cache 30. Each load register has an affiliated multiprocessor speculation (MS) flag that indicates whether or not the load request is issued speculatively (i.e., subject to a previous sync operation). Thus, load register 0 209 has an affiliated MS flag 210, and load register 7 211 has an affiliated MS flag 212. Load requests that are subsequent to a sync in program order can be issued speculatively before the sync op completes on the system bus when tracked by an affiliated MS Flag. In the preferred embodiment, as illustrated, a separate MS flag is set for each load request issued while sync op completion is pending, i.e., LRQ 208 has an MS flag for each load request. In an alternate embodiment, where LRQ 208 issues load requests to L1 data cache 26 or L2 cache 30 sequentially, LRQ 208 may have a single MS flag and set the MS flag for the first load request issued prior to receipt of a sync ack.

In the preferred embodiment, LSU includes a barrier operation (BOP) controller 221, which is coupled to both the LRQ 208 and the store/barrier queue 207. BOP controller 221 comprises hardware logic by which the setting of the MS flag and other operations, which effectuate the speculative loads of the invention, are completed. BOP controller 201 is coupled to L2 cache 30 via ack/snoop bus 214 by which sync acknowledgments, castout invalidates and snoop invalidates are transmitted to BOP controller 201.

As described, BOP controller 221 maintains the MS flags, which mark speculative loads executed out-of-order with respect to previous syncs. BOP controller 221 monitors the store/barrier queue 207 to determine when a sync operation, which is sequentially ahead of issued load instruction(s), has not been completed. MS flags 210, 212 may be latches, which are set by BOP controller 221. MS flags 210, 212 may be "set" when a load instruction is dependent on a previous sync, i.e., a speculative load, or "reset" when a load instruction is not dependent on a previous sync or the sync ack has been received at LSU 201. MS flags 210, 212 may also be registers that include a single bit or group of bits depending on its desired functionality, as will become clear later. When implemented as a single bit, MS flags 210, 212 have a first set value (e.g. "1"), which represents to the LSU that the load is a speculative load, i.e., subject to receipt of a sync ack. MS flags 210, 212 also have a second value (e.g. "0") that represents to the LSU that execution of the load does not depend on the receipt of a sync ack.

Store/barrier queue 207 receives and issues store operations and syncs. It is important that store operations remain ordered with their respective sync ops during execution. For example, a sync operation cannot be issued on the system bus 20 until all store operations from the previous group of instructions have completed on the system bus 20. However, once all store operations from the previous group have completed on the system bus, the store operations from a subsequent group can be issued.

Thus, the following rules apply with respect to execution order on the system bus with respect to store operations: (1) sync operations cannot be completed before store operations from the same or a previous group; (2) store operations from a group cannot be completed before store operations from a previous group; (3) store operations from a group can pass a sync op from a previous group; and (4) store operations from a group can be completed before store operations from within the same group.

Transfer of instructions and data between the various components of FIG. 2 are completed with interconnect buses as shown. Thus, for example, both load dispatch control unit 205 and store/barrier queue 207 receive load and store/barrier instructions, respectively, from adder 218 via a core load/store request bus 217, and data is returned from L2 cache 30 via load data return bus 215. Further, system bus 20 provides a connection between L2 cache 30 and the external system components. Although LSU 201 is depicted in FIG. 2 as having specific components, it is understood that additional components may be included within LSU including, for example, an address translation buffer. The presented figure is utilized for illustrative purposes only and is not meant to be limiting on the invention.

Multiprocessor Speculation Mechanism via a Barrier Speculation Flag

The exemplary instruction sequence in FIG. 6A, which was discussed above, demonstrates the performance advantage of the present invention. During processing of the instruction stream, sync_A is issued along with or following the group A instructions. Immediately after the group A instructions are issued and before the sync ack of sync_A is received by BOP controller 221, LRQ 208 issues the load instructions from group B. When the load instructions of group B are placed in LRQ 208 for issuing, the corresponding MS flags are set by BOP controller 221 to indicate that the load requests are speculative with respect to sync_A. The load data from group B instructions are returned from L1 cache 26, L2 cache 30 or memory 16 and stored temporarily in a MS storage location. When the sync ack is received by BOP controller 221, BOP controller 221 resets the corresponding MS flags.

Thus, loads that are subsequent to a sync can be issued before the sync completes in the memory system (i.e., before a sync ack is received by BOP controller 221); however these loads are treated as speculative loads, and the MS flag is set for all load requests from group B. Also data returning for a speculative load request is held in the MS storage location and not placed in the processor's architected registers (e.g., general purpose registers), that is, not "written back," until a sync ack is received by BOP controller 221. In addition, if a snoop invalidate bus transaction is detected on system bus 20 for any data being speculatively fetched before the sync ack is received, then the particular load request must be re-issued. If the re-issue occurs after the sync ack is received, then the load can be treated as a normal non-speculative load.

In the preferred embodiment, the MS storage location in which data is temporarily held is the corresponding register of the LRQ 208 from which the load request was issued. Alternatively, the location may be within the BOP controller 221. In another embodiment, the MS storage location is a temporary location within L1 data cache 26, and the returned data are held temporarily in L1 data cache 26 with an "invalid" flag appended. The invalid flag is removed when the sync ack is received, and the data may then be sent to the processor registers or execution units. Alternate storage locations are possible for speculative load data, and use of any such location, which provides efficient temporary storage for the speculatively loaded data, is understood to fall within the scope of the invention. One major advantage of the invention is that the subsequent loads can be performed while the sync op is also being performed. Processor performance is improved because the loads and syncs are now performed in parallel.

Figure 3A:
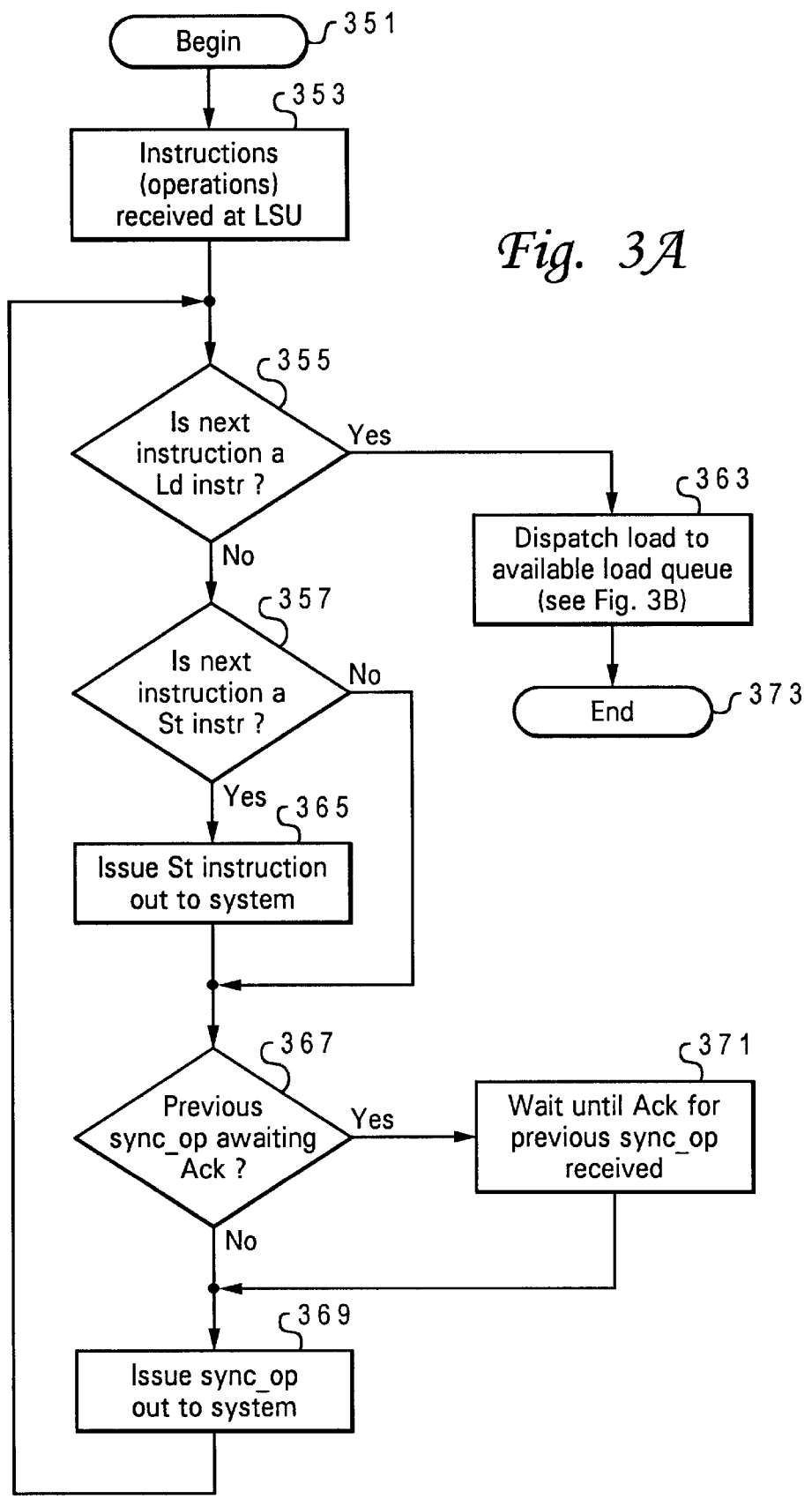
FIGS. 3A and 3B are logic flow charts of processes by which load instructions are speculatively executed beyond a sync op in accordance with a preferred embodiment of the present invention.
Figure 3B:
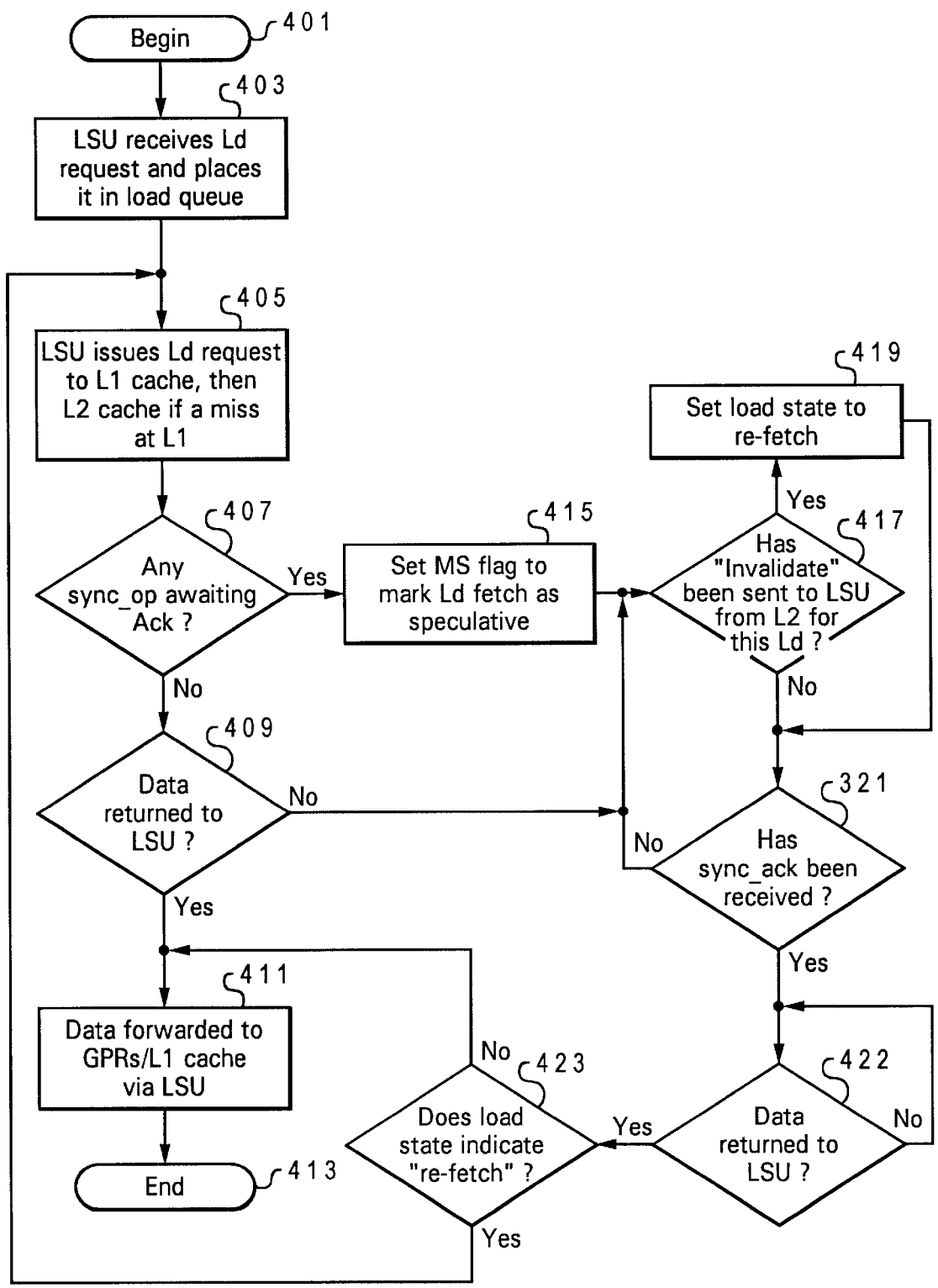

Asynchronously Overlapping Storage Barrier Operations With Old and New Storage Operations FIGS. 3A and 3B illustrate steps in the process of executing memory operations beyond a sync op according to the invention. In FIG. 3A, the process begins at block 351 and thereafter proceeds to block 353, where the sequence of is instructions is received at LSU 201. A determination of whether the next instruction in the sequence is a load instruction is made at block 355. If the instruction is a load instruction, it is dispatched to LRQ 208 at block 363. The process by which the LRQ 208 processes the load is described below with reference to FIG. 3B. Then, the process ends at block 373.

Returning now to block 355, if the next instruction is not a load instruction, the next instruction is sent to store/barrier queue 207. A determination is then made of whether the instruction is a store instruction at block 357. If the instruction is a store instruction, it is issued to the L1 data cache 26 or L2 cache 30 or memory 16 at block 365 following the restrictions on ordering store instructions described above. If the instruction is not a store instruction, then it is a sync, and a determination is made whether there is an outstanding (i.e., not yet completed) sync operation on system bus 20 at block 367. If there is no outstanding sync operation on system bus 20, then a sync transaction is issued on system bus 20 at block 369. If, however, there is an outstanding sync operation on system bus 20, then LSU 201 waits until the sync ack is received at BOP controller 221 for the previous sync op at block 371 before issuing the sync transaction on system bus 20 at block 369. Thus, in this embodiment, only one degree of speculation is permitted. When a next sync is encountered, LSU 201 waits until the ack from the previous sync op is received before proceeding with subsequent issuance of syncs and following load or store instructions.

Referring now to FIG. 3B, there is illustrated a preferred embodiment of a method by which LRQ 208 processes speculative load instructions. The process begins at block 401 and thereafter proceeds to block 403, where LSU 201 receives a load instruction, and load dispatch control 205 places corresponding load requests in LRQ 208. LRQ 208 then issues a load request at block 405 to L1 data cache 26, and then L2 cache 30 if the load request misses in L1 data cache 26. A determination is made by BOP controller 221 at block 407 whether any previously issued sync transaction has still not completed on system bus 20. If there is no outstanding sync ack, i.e., the previous sync op received a sync ack, or no previous sync was issued, then a determination is made at block 409 whether or not data returned to LSU 201 from L1 data cache 26, L2 cache 30, or memory 16. If data returned, then LSU 201 forwards the data to processor registers or execution units at block 411. Then the process ends at block 413.

Returning to decision block 407, if a sync op is still awaiting an ack, then BOP controller 221 sets the MS flag for that load instruction within LRQ 208 at block 415. A determination whether LSU 201 received an invalidate for the particular load instruction is then completed at block 417. If LSU 201 received an invalidate, the local state of LSU 201 is set to enable re-issue of the load request so new data maybe fetched at block 419. If LSU 201 did not receive an invalidate, a check is made for the receipt of the sync ack at block 321. If the sync ack has not it been received, the process returns to block 417, where LSU 201 continues to wait for an invalidate until the sync ack has been received. However, if BOP controller 221 receives a sync ack, then a determination is made at block 422 whether the data returned. Then, a decision whether the load state indicates a re-issue of the load request, i.e., an invalidate was received, is made at block 423. The latter determination also waits on the return of data. If the load state indicates re-issue of the load request, then the process returns to block 405, where LSU 201 re-issues the load request to L1 data cache 26 and L2 cache 30. If, however, the load state does not indicate that the load must be re-issued, then LSU 201 forwards the data to the processor registers or execution units at block 411.

Various changes may be made to the flow processes of FIGS. 3A and 3B. Particularly, although the figure is described with respect to a single load request per sync op, it is understood that any number of load requests as well as store requests may be issued from LSU 201 both before and after each sync. Also, in some embodiments the returned data may be stored in L1 data cache 26 rather than being sent directly to the processor registers or execution units. Additional steps may be included and/or the order of the steps re-arranged to provide different embodiments which fall within the spirit and scope of the invention.

The present invention removes the condition that the memory system cannot service any load request from group B of the instruction stream of FIG. 6A until the sync_A is completed on the system bus 20. The invention further removes the ordering constraints of syncs and loads and manages syncs relative to loads occurring after the syncs in program order. The memory system does not have to maintain any ordering information for issue and/or completion of the sync ops relative to subsequent load requests. The order is instead managed by BOP controller 221, which utilizes MS flags 210, 212 in LRQ 208 for any speculative loads.

Imprecise Recycling of Storage Operations

One important aspect of the invention involves the monitoring of the system bus for invalidates, and the effect of specific types of invalidates on the speculative load processes. In one embodiment, different types of invalidates are received at LSU 201 from system bus 20 or L2 cache 30. BOP controller 221 determines, based on the type of invalidate received, whether or not to discard the data from the speculative loads and re-issue the load request. BOP controller 221 monitors for an invalidate during the window between starting a speculative load and receiving a corresponding sync ack from the system (e.g., this window may be 100 processor cycles in a GHz processor). If, for example, a snoop invalidate for a speculative load is seen, LSU 210 must recycle at least that one speculative load and re-issue the load request.

BOP controller 221 monitors for and responds to specific types of invalidates to determine how to treat a speculative load request. Invalidates caused by castouts from L2 cache 30 or from memory 16 do not need to force a re-issue of a speculative load. Snoop invalidates, however, cause a speculative load request to be re-issued and the previously fetched data discarded. Castout invalidates occur when a full L2 cache 30 has a miss, and L2 cache 30 is forced to fetch the line from a lower level of memory 16. Since the miss occurs, L2 cache 30 has to make room in the cache and to issue an invalidate to remove the line from the L1 data cache 26 (or other MS temporary holding location). The is speculatively issued load request is not re-issued because no change of data occurs.

The possible actions taken by LSU 201 upon detection of a kill include: recycling all speculative loads, recycling only the specific load hit by the invalidate, and recycling only the specific load hit by an invalidate of the proper type. Thus, there is a specific invalidate. The invalidate address is compared against the cache line address of each of the loads and only the load request having the invalidate address as a target address is re-issued. There is also a general kill, which forces all speculative load requests to be re-issued if any invalidate is received while waiting for the sync ack. Finally, there is a forward kill. LRQ 208 only re-issues speculative load requests for invalidates due to snoop invalidates (i.e., kills due to castouts from the L2 cache 30 do not need to force a re-issue).

Figure 5:
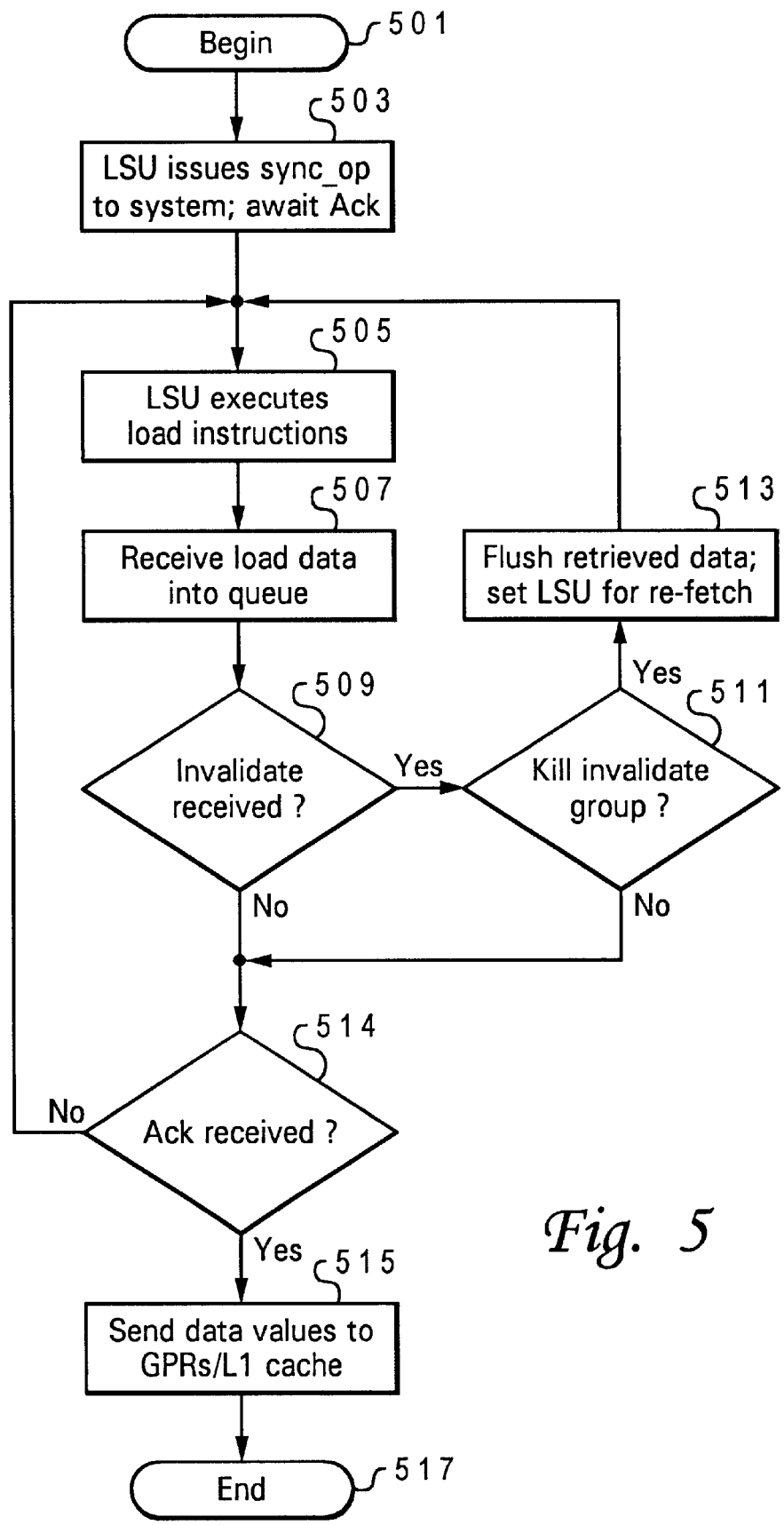
FIG. 5 is a logic flow chart illustrating the effects of kill invalidates on the process of implementing speculative loads beyond a sync op in accordance with the present invention.

FIG. 5 illustrates the process of handling invalidates received. The process begins at block 501, and thereafter proceeds to block 503, where a sync operation is issued on system bus 20. Following the issuing of the sync, speculative load requests are issued by LRQ 208 at block 505, and the loaded data are received into LRQ 208 at block 507. BOP controller 221 checks for a receipt of an invalidate from system bus 20 at block 509. If an invalidate is received, then BOP controller 221 further determines at block 511 if the invalidate is a type of invalidate it for which the load request is re-issued. When an invalidate is of the type which requires a re-issue of the load request, the corresponding loaded data received into LRQ 208 are discarded, and LRQ 208 is set to re-issue the load request at block 513. If no invalidate is received or a received invalidate does not require a re-issue of the load request, then a check is made for the receipt of the sync ack at block 514. When the sync ack is received at BOP controller 221, the data stored in the LRQ 208 are forwarded to the processor registers or execution units at block 515. Then the process ends at block 517.

Efficiently Managing Multiple Barrier Operations

In a preferred embodiment, the functionality of the invention is extended to allow speculative execution of instructions beyond multiple syncs. The implementation of this embodiment is described with reference to the instruction stream illustrated in FIG. 6B. As shown in FIG. 6B, instructions 4, 8, 12, and 16 are sync instructions (namely, sync_A, B, C, and D). Preceding each sync instruction in program order are a number of load and store operations. According to the present embodiment, after sync_A has been issued, all subsequent load operations, including those after syncs B and C, may be executed prior to the receipt of the sync ack of sync_A at BOP controller 221.

BOP controller 221 and LRQ 208 control the issuance of the speculative loads and set the MS flags. In one embodiment, each MS flag is a multiple-bit register, and each group of load instructions separated by a sync is assigned a particular bit within the multiple-bit register. Thus, an MS group flag with register value "111" indicates that three previous sync acks are outstanding. If another sync is encountered in the instruction sequence, BOP controller 221 appends another bit to the MS group flag, which now becomes "1111". As the sync acks return, BOP controller 221 changes the MS group flag (111) to "11" and then to "1". An MS group flag value of "0" would thus indicate that all previous sync acks have been received. As in the single sync embodiment, the load transactions are executed prior to the return of the previous sync acks, and the load data are held temporarily in LRQ 208, and are not forwarded to the processor registers or execution units until the sync acks for all previous syncs ops have been received at BOP controller 221. If, for example, instruction 13, Ld-C0, is executed, the loaded data are held in LRQ 208 until the sync acks for sync-A, sync-B, and sync-C have all returned to BOP controller 221. If an invalidate is received before any one of the previous sync acks returns, the data are discarded from LRQ 208, and the load request is re-issued to fetch the correct data. If all previous sync acks have returned when the load request is re-issued, the load request is non-speculative. However, if the load request is re-issued before all previous sync acks are received, the re-issued load request is treated as speculative.

The multiple sync speculation embodiment may also be implemented using a sync group ID, which explicitly identifies a particular sync and the associated load requests with the particular sync group. BOP controller 221 tracks the load requests so that the specific group to which a load request belongs is known.

According to the above implementation, an MS group flag is contained in LRQ 208 for each load issued while return of a sync ack is pending. The MS group flag is set by BOP controller 221 when LRQ 208 issues a load (e.g., from group D) if BOP controller 221 is still waiting for a previously issued sync operation (i.e., Sync-A,B, and/or C) to be completed on system bus 20. The MS group flag is reset only when all previous sync acks have returned, indicating all previous sync ops have completed.

In this embodiment, LSU 201 handles speculative loads for the MS group flag in a similar manner as with the single sync embodiment described above. Thus, the following processes are followed:

(1) Loads that are subsequent to a sync can be issued before that sync completes on system bus 20 (i.e. before a sync ack is received) but they must be treated as speculative loads (i.e., MS group flag is set for loads from group D);

(2) Any data returning for a speculative load are held in LRQ 208 and not returned to the processor registers or execution units until all sync acks from earlier sync ops have been received;

(3) If a system bus invalidate is received that targets a speculative load from group D (e.g., Ld-C1) before sync acks are received for sync-A, B, and C, then Ld-C1 must be re-issued to retrieve the latest data (i.e., data returned for earlier issuance of this load request must be discarded). The re-issuance of Ld-C1 may occur several times if several invalidates occur; and (4) Once sync acks (i.e., acks for sync-A,B,C) have been received for all earlier syncs, the load data for group D load requests can be supplied to the processor registers and execution units.

Figure 4A:
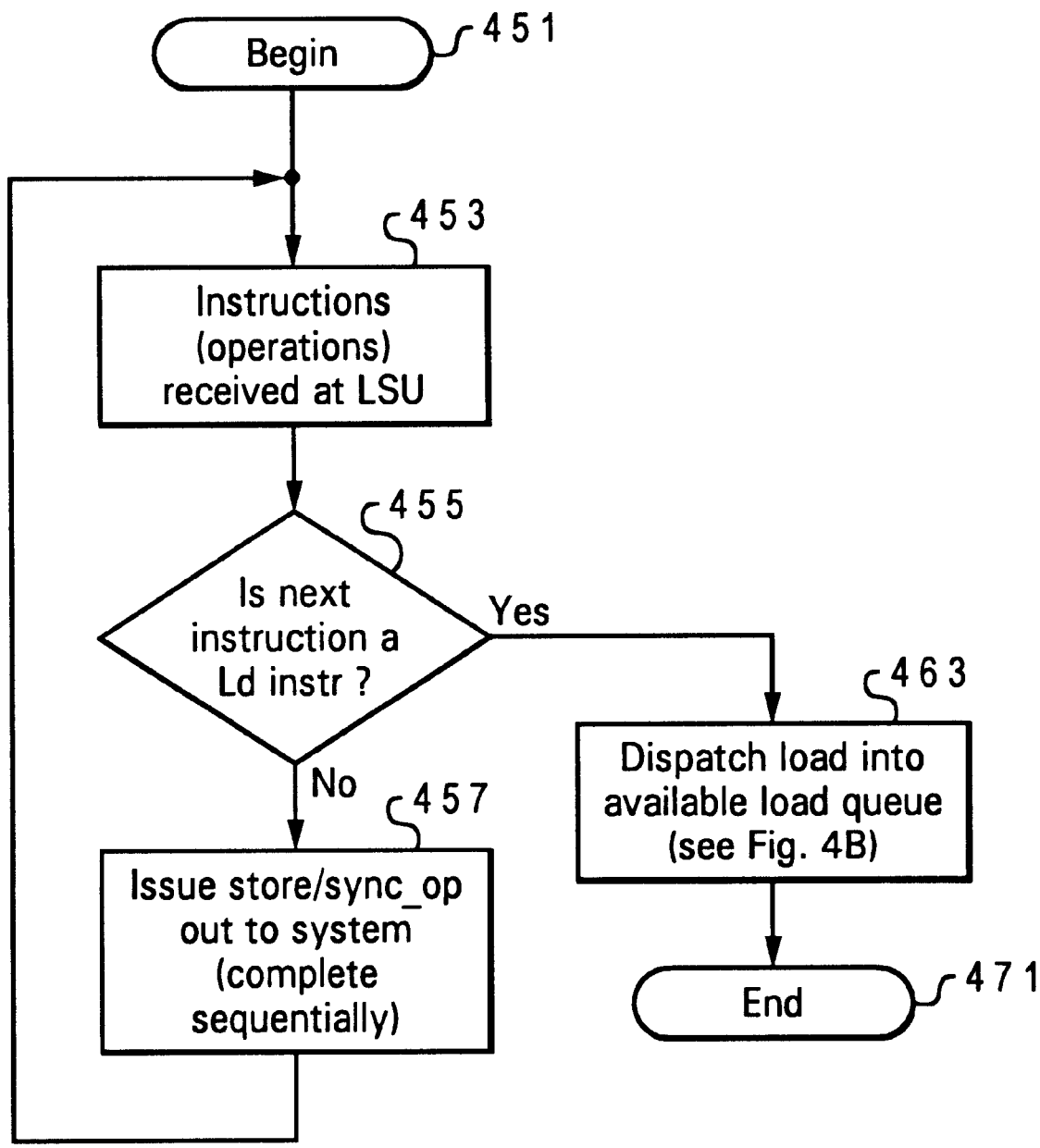
FIGS. 4A and 4B are logic flow charts that together illustrate a process of speculatively executing instructions beyond multiple syncs in accordance with the present invention.

FIG. 4A illustrates the process by which speculative issuance of load instructions is completed with multiple syncs. As described above, the process involves setting MS flags, which may comprise multiple-bit registers or MS group flags, and LSU 201 executing load instructions according to a hardware logic control scheme for multiple sync ops. The process begins at block 451 and thereafter proceeds to block 453, where the sequence of instructions is received at LSU 201. A determination of whether the next instruction in the sequence is a load instruction is made at block 455. If the instruction is a load instruction, then LSU 201 dispatches the load request to a register of LRQ 208 at block 463. The process then ends at block 471. If, however, the next instruction is not a load instruction, then it is a store or sync op, which is placed in store/barrier queue 207 from which the next instruction is later issued at block 457. Following block 457, another instruction is received by LSU 201 at block 453 as the process continues.

Figure 4B:
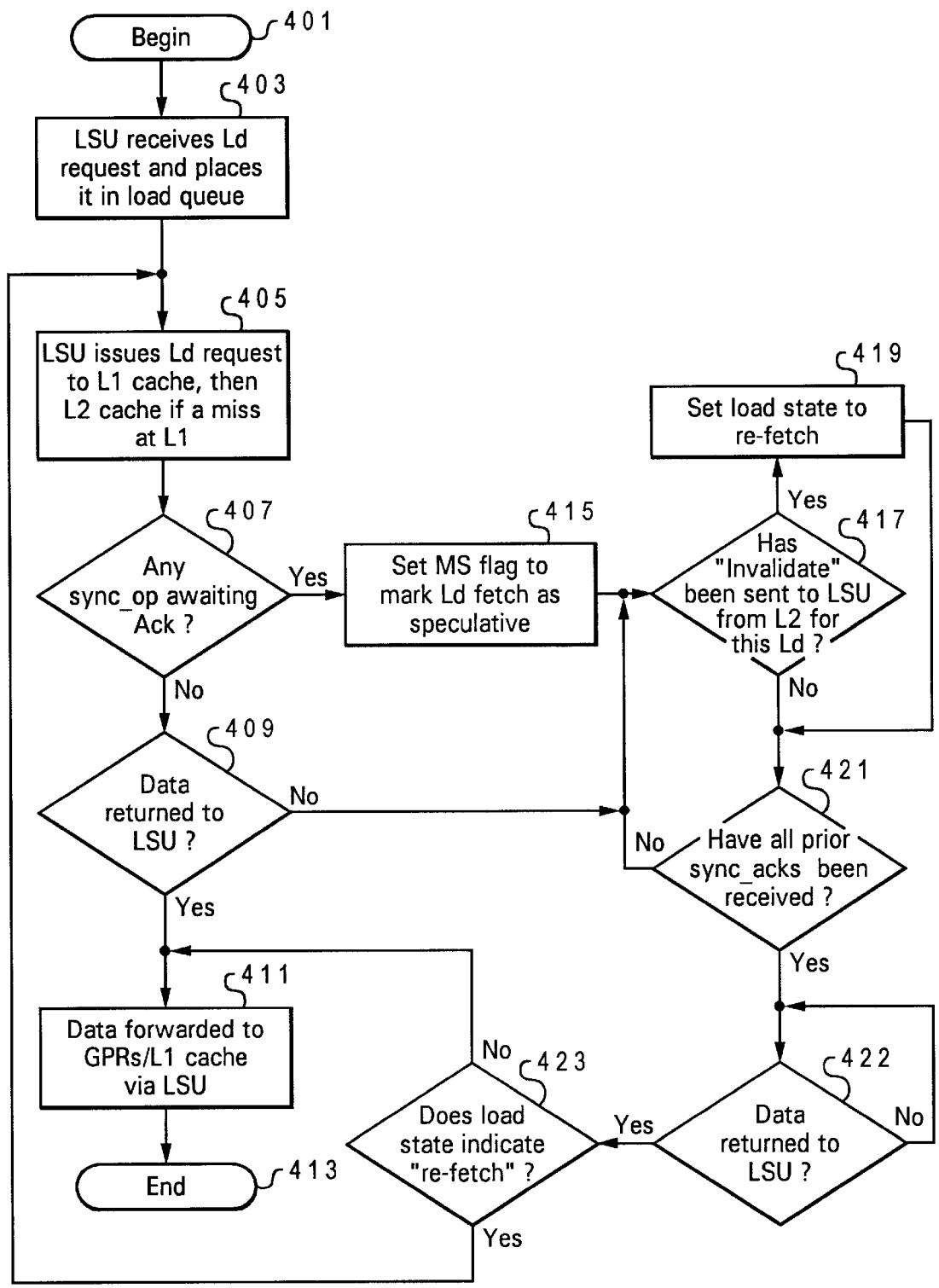

Referring now to FIG. 4B, the process by which the load request is speculatively issued is illustrated. FIG. 4B is similar to FIG. 3B and like blocks are accordingly numbered the same. FIG. 4B, however, applies to a multiple sync embodiment and thus blocks 407 and 421 of the process check for multiple sync ops and corresponding multiple sync acks on system bus 20.

The primary advantage of this multiple sync speculative embodiment is that the issuance of any load operation in the instruction stream does not have to wait for one or more earlier syncs to complete. As processors operate at higher and higher frequencies, out of order execution scales accordingly. However, the processing of sync ops does not scale with higher processor frequencies due to the serial dependency of completion in the memory system. The present invention removes the processor's serial execution dependency on the memory system, improving the overall system performance.

Enabling Weak Consistent Storage Advantage to a Firmly Consistent Storage Architecture The present invention also advantageously enables a firmly consistent processor to operate with a weakly consistent storage subsystem. As described above BOP controller 221 enables memory and other instructions to be executed beyond one or more syncs. In firmly consistent processors, an implied sync follows each instruction. The present invention therefore treats implied syncs as actual syncs to allow speculative execution of subsequent memory instructions. The preferred embodiment utilizes the multiple sync speculation described above to permit existing firmly consistent processor architectures (such as, for example, the x86 and /390) to be connected to a weakly consistent storage subsystem and operate as efficiently as weakly consistent processor architectures. The primary advantages achieved are that existing firmly consistent processors can now have the advantage of utilizing much faster weakly consistent memory system, and prior software applications, which run on the firmly consistent processors, do not need to be rewritten to include syncs.

FIG. 6C is a table summarizing the processing of an instruction sequence of a firmly consistent processor having a weakly consistent storage subsystem. The first column illustrates the order in which a processor ISU 200 issues the instructions to LSU 201 (i.e., the program order). In the second column, LSU 201 receives the instructions and places a sync after each instruction, i.e., a sync is placed in the barrier/store queue to be issued to the memory system. In the memory system, the operations for rows 1–4 of instructions in the table may occur in any order. The only requirement is that the store operations (i.e., St-C0) complete on the system bus before their respective barrier instructions (i.e., Sync-C). In the forth column, the order of providing the results back to the processor registers, L1 data cache 26, and/or execution units reflects the original program order of the instructions. The sync acks have to return to the LSU in the order (i.e., the original processor order) in which they were issued on the system bus, as described herein. Thus the program order is maintained irrespective of the actual operation order of the instructions in the memory system.

Folding Storage Barrier Operations

In another multiple sync embodiment, each of the previously encountered syncs are collapsed into a single sync whenever instructions from the next group of instructions are executed before a sync from the previous group has being issued from load/barrier queue 207. Thus, LRQ 208 continues to issue load instructions without BOP controller 221 receiving sync acks for each of the previous sync ops. In this embodiment, when an invalidate is encountered, the invalidate is applied to any speculative load request that is still awaiting on the receipt of a sync ack(s).

In the preferred implementation, store/barrier queue 207 combines multiple syncs into one sync, which is issued on system bus 20. Thus, whereas previously a corresponding sync operation was issued on system bus 20 for each sync (i.e., a serialized issuing of syncs), the present implementation enhances the multiple sync speculation functionality by combining multiple syncs into a single bus operation. BOP controller 221 monitors the store instructions before each sync. Because store/barrier queue 207 allows store instructions from a group to be issued prior to a sync op from a previous group, all store instructions is from a following group may be issued before the sync for the previous group is issued. BOP controller 221 forces the sync from the previous group to be combined with the sync from the next group. Thus, only the second sync remains in store/barrier queue 207 to be issued on system bus 20. Of course, this process may continue for later syncs, whose store instructions are issued before the combined sync is issued.

Accordingly, all previous load operations are completed subject to the receipt of a sync ack for the second (or combined) sync. The receipt of a sync ack provides completion information for all the previous load/store operations, including those preceding each of the syncs which are combined. FIG. 6D illustrates this feature of the invention. As shown in the second instruction list, syncs A and B are issued as a single combined sync transaction on the system bus. BOP controller 221 thus receives a single sync ack from system bus 20, which indicates completion of all the instructions prior to both sync A and B. By combining syncs, less system bus cycles are required to complete sync operations.

Figure 7:
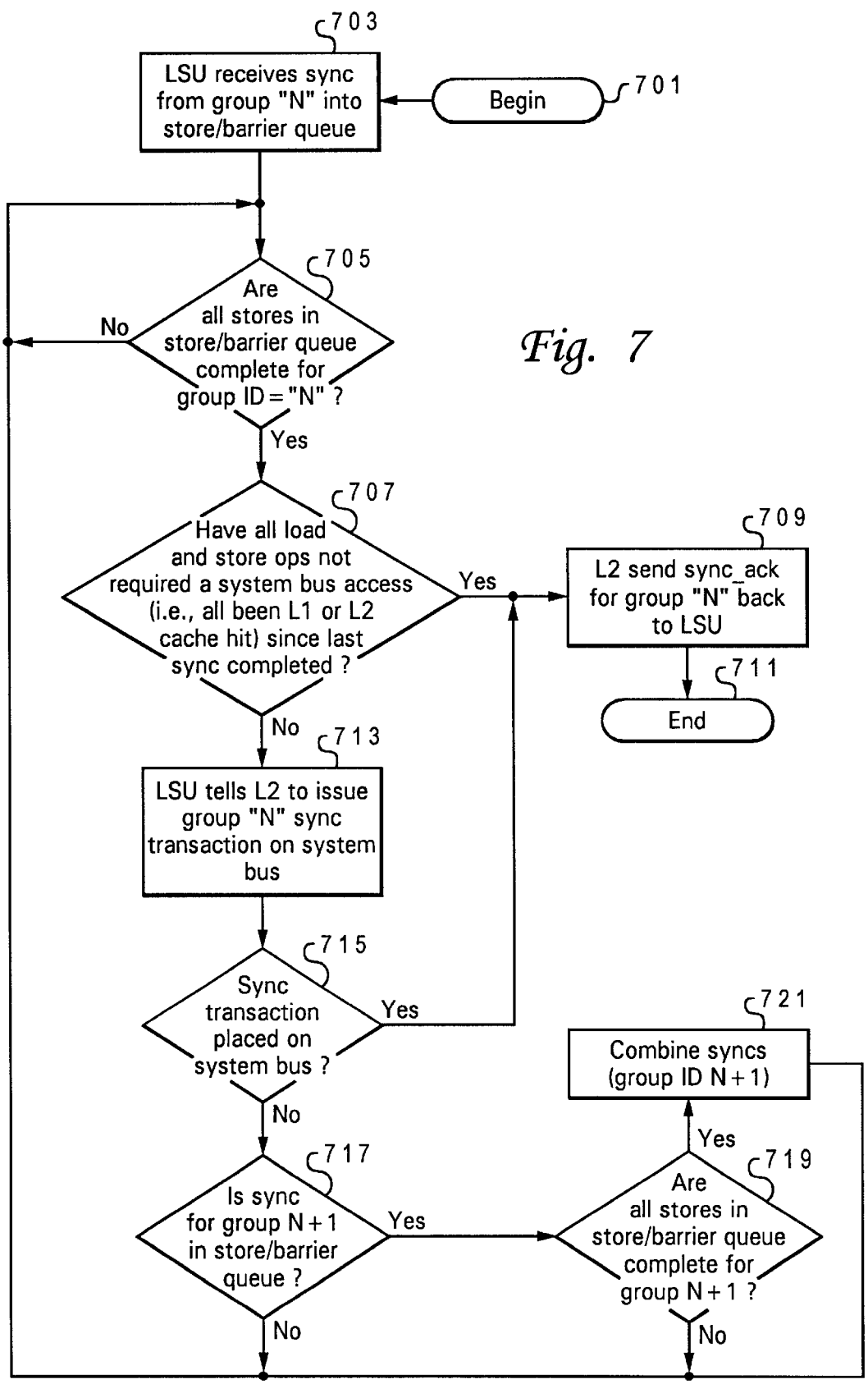
FIG. 7 is a flow chart illustrating the process of combining sync instructions to yield a single sync operation on the system bus in accordance with a preferred embodiment of the invention.

FIG. 7 illustrates a process by which sync instructions are combined to provide a single occurrence of a sync operation on the system bus. The process begins at block 701, and thereafter proceeds to block 703, where LSU 201 receives a sync from a particular group (group "N") and places the sync in store/barrier queue 207. A determination is then made at block 705 of whether all the store operations for group N have been completed (i.e., there are no stores operations from group N left in store/barrier queue 207). If there are no more group N store operations, a next determination is made at block 707 of whether all the load and store operations from group N were completed without accessing the system bus 20, i.e., all the load/store operations of the group hit at L1 data cache 26 or L2 cache 30. When all the load/store operations hit at L1 data cache 26 or L2 cache 30, L2 cache 30 sends a sync ack for group N to BOP controller 221 at block 709. Then the process ends at block 711.

If however, any of the load/stores from group N did not hit at L1 data cache 26 or L2 cache 30, BOP controller 221 causes L2 cache 30 to place the sync transaction from group N on the system bus 20 at block 713. A determination is then made whether the sync transaction is placed on system bus 20 at block 715. If the sync transaction is placed on system bus 20, the process proceeds to block 709, where L2 cache 30 waits until it receives the sync ack and sends the group N sync ack to BOP controller 221. If the sync transaction was not acknowledged on system bus 20, a next determination is made at block 717 of whether the sync from the following group (group N+1) has been received by LSU 201 and placed in store/barrier queue 207. If the group N+1 sync is in store/barrier queue 207, a determination is made at block 719 of whether all the store operations for group N+1 have been completed. When all the group N+1 store operations have been completed, the group N sync is combined with the group N+1 sync to yield a combined sync, which is the group N+1 sync at block 721. The process then repeats for each subsequent group of load/store operations and associated syncs.

Multi-level Multiprocessor Speculation Mechanism

Syncs are required to be issued only when load/store operations require the system bus 20 to complete. Thus, when a load/store operation utilizes the system bus 30 to complete, a sync op is required to control the flow of instruction issuing in LSU 201. However, when no system bus transaction is required to complete the load/store operations, which precede a sync in program order, a system bus sync operation is not required. The present invention provides a method for removing syncs from an instruction stream based on a determination of when all prior load/store instructions are completed within the processor. Specifically, BOP controller 221 monitors the load/store operations to determine if all the load/store operations, which are sequentially before a sync in program order, are executed at either L1 data cache 26 or L2 cache 30. When all the load/store operations are executed at either cache, BOP controller 221 recognizes that the system bus sync operation is not required for that group of load/store instructions and withholds issuing the sync on system bus 20. Using the combining functionality described above, another embodiment may combine syncs when a determination is made that the load/store instructions do not require system bus sync operation. BOP controller 221 resets the respective MS flag to allow the data to be forwarded to the processor registers or execution units.

Multiprocessor Speculation Within a Speculative Branch Path

One embodiment of the invention combines the speculative load functionality with branch prediction to further enhance the branch prediction mechanism of the processor. In previous processor architectures, when a processor went down a predicted path (i.e., target or in-line path) processing of instructions within that path could only be completed up to the first sync in the instruction sequence. The processor waits until the branch is resolved as correctly taken before continuing to process the instruction sequence.

In this embodiment, LRQ 208 continues to issue subsequent load requests, albeit speculatively, while waiting for both the sync acks and the determination of the correctness of the branch path. When the branch is resolved as correctly predicted, substantial amounts of processing of the instruction sequence in the path has occurred, resulting in faster processor operation. If the branch is resolved as be mispredicted, then all speculative loads within the path, both before and after sync(s) are discarded. Thus, if the path is incorrect, speculative processing beyond the sync does not affect processor operation.

In this embodiment, the processor speculates further down a predicted execution path without knowing if the load/store instructions are actually required. In one embodiment, the MS flag is set, but because the sync ack is not yet needed (i.e., the predicted execution path has not yet been resolved as correctly taken), the execution of subsequent loads continues without issuing the syncs out to the system bus. If the predicted execution path is correct, then the processor issues the syncs, and BOP controller 221 waits for the sync acks. Once the ack(s) are received, the loaded data are forwarded to the processor registers and execution units.

Figure 8:
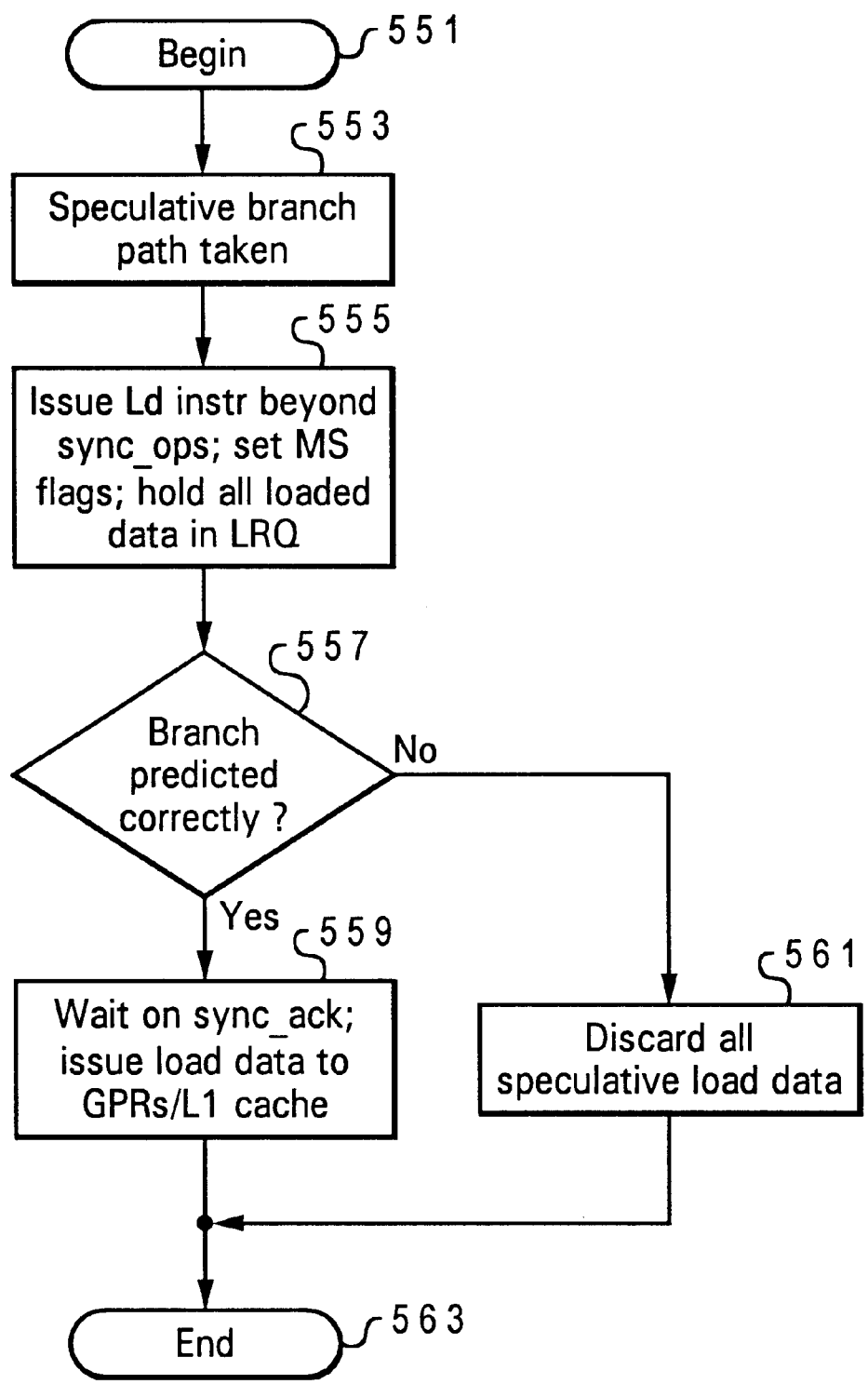
FIG. 8 is a logic flow chart of the process of utilizing the functions of the present invention within a branch prediction mechanism in accordance with the present invention.

FIG. 8 illustrates the process of handling speculative execution paths beyond a sync. The process begins at block 551 and thereafter passes to block 553, where a speculative execution path is taken. When instructions within the speculative execution path are executed, LRQ 208 issues speculative load requests beyond the syncs, BOP controller 221 sets the corresponding MS flags, and the loaded data are held in LRQ 208 at block 555. A determination whether the speculative execution path was correctly taken is made at block 557. If the speculative execution path is determined to be correct, BOP controller 221 waits for receipt of the sync ack(s), and the speculative load data stored in LRQ 208 are forwarded at block 559 as described above. If, however, the speculative execution path is incorrect, then the load data and other process results are discarded at block 561. The process thereafter ends at block 563. Those skilled in the art will appreciate that although FIG. 8 illustrates basic steps in implementing the above functionality in a particular sequence, additional or fewer steps may be utilized, and the steps may be presented in different order.

While illustrative embodiments have been particularly shown and described, it will be understood by those skilled in the art that various changes in form and detail may be made therein without departing from the spirit and scope of the illustrative embodiments.

What is claimed is:

1. A method of operation within a data processing system comprising:
    receiving an instruction sequence including a barrier instruction followed by a load instruction in said instruction sequence; and
    in response to said barrier instruction, initiating a barrier operation on a system interconnect;
    speculatively issuing a load request corresponding to said load instruction to memory, wherein said load request is issued before a completion of said barrier operation that was initiated prior to said load request; and when a snoop invalidate is detected for said speculatively issued load request before completion of said barrier operation, discarding any data returned by said load request and re-issuing said load request.

2. The method of claim 1, further comprising the steps of: setting a flag to a first value to indicate that said load request is speculative, pending receipt of an acknowledgment of the completion of said barrier operation; and resetting said flag to a second value when said acknowledgment is received.

3. The method of claim 1, further comprising the steps of: temporarily holding data returned by said speculatively issued load request; and forwarding said data to a register or execution unit of the data processing system when the acknowledgement of the completion of said barrier operation is received.

4. The method of claim 3, wherein said temporarily holding step includes the step of holding said data in a processor.

5. The method of claim 3, wherein said temporarily holding step includes storing said data in a cache.

6. The method of claim 1, wherein said instruction sequence includes a store instruction that precedes said barrier operation in said instruction sequence, and wherein said method further comprises the step of enforcing in-order execution of said store instruction and said barrier operation, wherein said store instruction is completed prior to completion of said barrier operation.

7. A processor comprising:
an instruction sequencing unit for fetching an instruction sequence for ordered execution, said instruction sequence including a barrier instruction followed by a load instruction the execution order; and a load/store unit (LSU) including a controller that initiates a barrier operation on a system interconnect in response to said barrier instruction and, which speculatively issues a load request corresponding to said load instruction, wherein said load request is issued to a memory via said system interconnect before an acknowledgement is received of a completion of said barrier operation; and wherein said controller further responds to a receipt of a snoop invalidate for said load request prior to said acknowledgement of said completion by discarding data returned by said load request and causing the load request to be reissued.

8. The processor of claim 7, wherein:
said load store unit includes a load request queue (LRQ) for issuing said load request; and said controller is coupled to said LRQ and sets a flag associated with said LRQ when said load request is issued speculatively.

9. The processor of claim 8, further comprising means for temporarily holding data returned by said speculatively issued load request.

10. The processor of claim 9, wherein said means for temporary holding data releases said data for use by said processor after an acknowledgment is received for said barrier operation.

11. A data processing system comprising:
a plurality of processors coupled to an interconnect;

a memory system also coupled to said interconnect; and a controller affiliated with at least one of said plurality of processors that issues a barrier operation associated with a barrier instruction in an instruction sequence and, prior to an acknowledgment of a completion of said barrier operation, speculatively issues a load request associated with a load instruction that sequentially follows said barrier instruction in execution sequence, wherein said load request is issued to a memory via said system interconnect before an acknowledgement is received of a completion of said barrier operation; and wherein said controller further responds to a receipt of a snoop invalidate for said load request prior to said acknowledgement of said completion by discarding data returned by said load request and causing the load request to be reissued.

12. The data processing system of claim 11, wherein:
said at least one of said plurality of processors comprise a load store unit (LSU), which receives said instruction sequence; and wherein further, said controller sets a flag associated with a load request queue (LRQ) of said LSU whenever said load request is speculatively issued.

13. The data processing system of claim 12, further comprising means for temporarily holding data returned from said speculatively issued load request.

14. The data processing system of claim 13, wherein said means for temporary holding data releases said data for use by said at least one of said plurality of processors after an acknowledgment is received for said barrier operation.

* * * * *